United States Patent
Hachiya et al.

(10) Patent No.: US 11,130,193 B2
(45) Date of Patent: Sep. 28, 2021

(54) FRICTION STIR WELDING TOOL AND FRICTION STIR WELDER

(71) Applicant: Yamazaki Mazak Corporation, Niwa-gun (JP)

(72) Inventors: Masayasu Hachiya, Niwa-gun (JP); Eiji Matsubara, Niwa-gun (JP); Toru Murakami, Niwa-gun (JP); Seigo Ouchi, Niwa-gun (JP)

(73) Assignee: YAMAZAKI MAZAK CORPORATION, Aichi (JP)

( * ) Notice: Subject to any disclaimer, the term of this patent is extended or adjusted under 35 U.S.C. 154(b) by 0 days.

(21) Appl. No.: 16/927,997

(22) Filed: Jul. 14, 2020

(65) Prior Publication Data

US 2020/0338664 A1 Oct. 29, 2020

Related U.S. Application Data

(63) Continuation of application No. PCT/JP2018/012201, filed on Mar. 26, 2018.

(51) Int. Cl.
*B23K 20/00* (2006.01)
*B23K 20/12* (2006.01)

(52) U.S. Cl.
CPC ........ *B23K 20/1255* (2013.01); *B23K 20/127* (2013.01); *B23K 20/123* (2013.01)

(58) Field of Classification Search
CPC .............. B23K 20/123; B23K 20/1245; B23K 20/122; B23K 20/125; B23K 20/1255;
(Continued)

(56) References Cited

U.S. PATENT DOCUMENTS 5,632,579 A 5/1997 Susnjara
2003/0047584 A1* 3/2003 Okamoto ............. B23K 20/123
228/2.1

(Continued)

FOREIGN PATENT DOCUMENTS

CN 1436110 8/2003
CN 201529848 7/2010
(Continued)

OTHER PUBLICATIONS

JP-2011036878-A computer english translation (Year: 2011).*
(Continued)

*Primary Examiner* — Erin B Saad
(74) *Attorney, Agent, or Firm* — Mori & Ward, LLP

(57) ABSTRACT

A friction stir welding tool includes a housing and a stir pin. The housing includes a first surface, a housing hole formed in the housing and having a housing hole opening on the first surface, and a discharge hole through which the housing hole is in communication with an outside of the housing. The stir pin includes a pin holder and a pin body. The pin holder has a first end portion and a second end portion. The first end portion is configured to be connected to a rotation spindle. The pin body is provided in the housing hole, is detachably attached to the second end portion, and is rotatable together with the pin holder around the rotation axis. The pin body includes a stir portion that protrudes from the first surface via the housing hole opening.

20 Claims, 9 Drawing Sheets

(58) Field of Classification Search
CPC .... B23K 20/126; B23K 20/127; B23K 20/12; B23K 20/1205; B23K 20/1235; B23K 20/1265; B23K 20/129; B23K 2103/10; B23K 20/121; B23K 20/1215; B23K 20/1225; B23K 20/1275; B23K 20/128; B23K 20/16; B23K 20/227; B23K 20/2275; B23K 20/26; B23K 2101/006; B23K 2101/045; B23K 2101/18; B23K 2101/36; B23K 2103/04; B23K 2103/18; B23K 2103/20; B23K 35/3073; B23K 37/003

See application file for complete search history.

(56) References Cited

U.S. PATENT DOCUMENTS

| | | | |
|---|---|---|---|
| 2009/0123778 | A1 | 5/2009 | Russell et al. |
| 2011/0274943 | A1 | 11/2011 | Fujii et al. |
| 2012/0080506 | A1* | 4/2012 | Matsunaga ........ B23K 20/1245 228/103 |
| 2012/0237788 | A1 | 9/2012 | Fujii et al. |
| 2015/0102087 | A1 | 4/2015 | Foerg et al. |

FOREIGN PATENT DOCUMENTS

| | | |
|---|---|---|
| CN | 102264501 | 11/2011 |
| CN | 105108316 | 12/2015 |
| CN | 205290064 | 6/2016 |
| CN | 206382700 | 8/2017 |
| EP | 1345729 | 9/2003 |
| EP | 1872893 | 1/2008 |
| JP | 61-120445 | 7/1986 |
| JP | 63-16910 | 1/1988 |
| JP | 2006-167729 | 6/2006 |
| JP | 2007-313520 | 12/2007 |
| JP | 2008-36659 | 2/2008 |
| JP | 2009-66721 | 4/2009 |
| JP | 2009-537325 | 10/2009 |
| JP | 2009-297826 | 12/2009 |
| JP | 2011036878 A * | 2/2011 |
| JP | 2018-001178 | 1/2018 |
| WO | WO 01/085385 | 11/2001 |
| WO | WO2010/074165 | 7/2010 |

OTHER PUBLICATIONS

Extended European Search Report for corresponding EP Application No. 18912144.5-1016, dated Aug. 10, 2020.
Office Action for corresponding EP Application No. 18912144.5-1016, dated Aug. 18, 2020.
International Search Report for corresponding International Application No. PCT/JP2018/012201, dated Jun. 12, 2018.
Written Opinion for corresponding International Application No. PCT/JP2018/012201, dated Jun. 12, 2018.
Japanese Office Action for corresponding JP Application No. 2018-536300, dated Oct. 2, 2018 (w/ English machine translation).
Japanese Office Action for corresponding JP Application No. 2018-536300, dated Mar. 1, 2019 (w/ English machine translation).
Japanese Office Action for corresponding JP Application No. 2018-229548, dated Sep. 25, 2019 (w/ English machine translation).
Japanese Office Action for corresponding JP Application No. 2018-229548, dated May 7, 2020 (w/ English machine translation).
Japanese Office Action for corresponding JP Application No. 2018-229548, dated Jan. 5, 2021 (w/ English machine translation).
Japanese Office Action for corresponding JP Application No. 2018-229548, dated Oct. 19, 2020 (w/ English machine translation).
Chinese Office Action for corresponding CN Application No. 201880070883.X, dated Nov. 10, 2020.
European Office Action for corresponding EP Application No. 18912144.5-1016, dated Mar. 4, 2021.

* cited by examiner

FRICTION STIR WELDING TOOL AND FRICTION STIR WELDER

CROSS-REFERENCE TO RELATED APPLICATIONS

The present application is a continuation application of International Application No. PCT/JP2018/012201, filed Mar. 26, 2018. The contents of this application are incorporated herein by reference in their entirety.

BACKGROUND OF THE INVENTION

Field of the Invention

The present invention relates to a friction stir welding tool and a friction stir welder.

Discussion of the Background

Friction stir welding is a technique known to weld workpieces together using a rotating tool mounted on a rotating head. Specifically, the rotating tool includes a shoulder and a pin separate from the shoulder so that the pin is rotatable relative to the shoulder. While making rotating motion, the pin is inserted into the workpieces, causing frictional heat between the rotating tool and the workpieces. The frictional heat causes a plastic flow of the workpieces, causing the workpieces to be welded together. Thus, with friction stir welding, workpieces are welded together without melting, which eliminates or minimizes excessive heat to be input into the workpieces. This eliminates or minimizes degradation of material quality of the workpieces, and eliminates or minimizes post-welding deformation.

One known technique of friction stir welding is implemented by friction stir welders disclosed in, for example, Japanese Translation of PCT International Application Publication No. JP-T-2009-537325 and JP 2007-313520A. These welders are used in applications such as continuous welding between butting portions of two members, and point welding (spot welding) between superimposed portions of two members.

SUMMARY OF THE INVENTION

According to one aspect of the present invention, a friction stir welding tool includes a housing and a stir pin. The housing includes a first surface, a housing hole formed in the housing and having a housing hole opening on the first surface, and a discharge hole through which the housing hole is in communication with an outside of the housing. The stir pin is provided in the housing hole to be rotatable around a rotation axis which passes through the housing hole opening. The stir pin includes a pin holder and a pin body. The pin holder has a first end portion and a second end portion opposite to the first end portion along the rotation axis. The first end portion is configured to be connected to a rotation spindle. The pin body is provided in the housing hole, is detachably attached to the second end portion of the pin holder, and is rotatable together with the pin holder around the rotation axis. The pin body includes a stir portion that protrudes from the first surface via the housing hole opening and that is configured to be inserted into a workpiece.

According to another aspect of the present invention, a friction stir welder includes a headstock, a machining table, a numerical controller, and a friction stir welding tool. The headstock includes a rotation spindle. On the machining table, a workpiece is held. The numerical controller is configured to control a relative movement of the headstock and the machining table relative to each other. The friction stir welding tool is mounted on the headstock. The friction stir welding tool includes a housing and a stir pin. The housing includes a first surface, a housing hole formed in the housing and having a housing hole opening on the first surface, and a discharge hole through which the housing hole is in communication with an outside of the housing. The stir pin is provided in the housing hole to be rotatable around a rotation axis which passes through the housing hole opening. The stir pin includes a pin holder and a pin body. The pin holder has a first end portion and a second end portion opposite to the first end portion along the rotation axis. The first end portion is connected to the rotation spindle. The pin body is provided in the housing hole, is detachably attached to the second end portion of the pin holder, and is rotatable together with the pin holder around the rotation axis. The pin body includes a stir portion that protrudes from the first surface via the housing hole opening and that is configured to be inserted into the workpiece.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
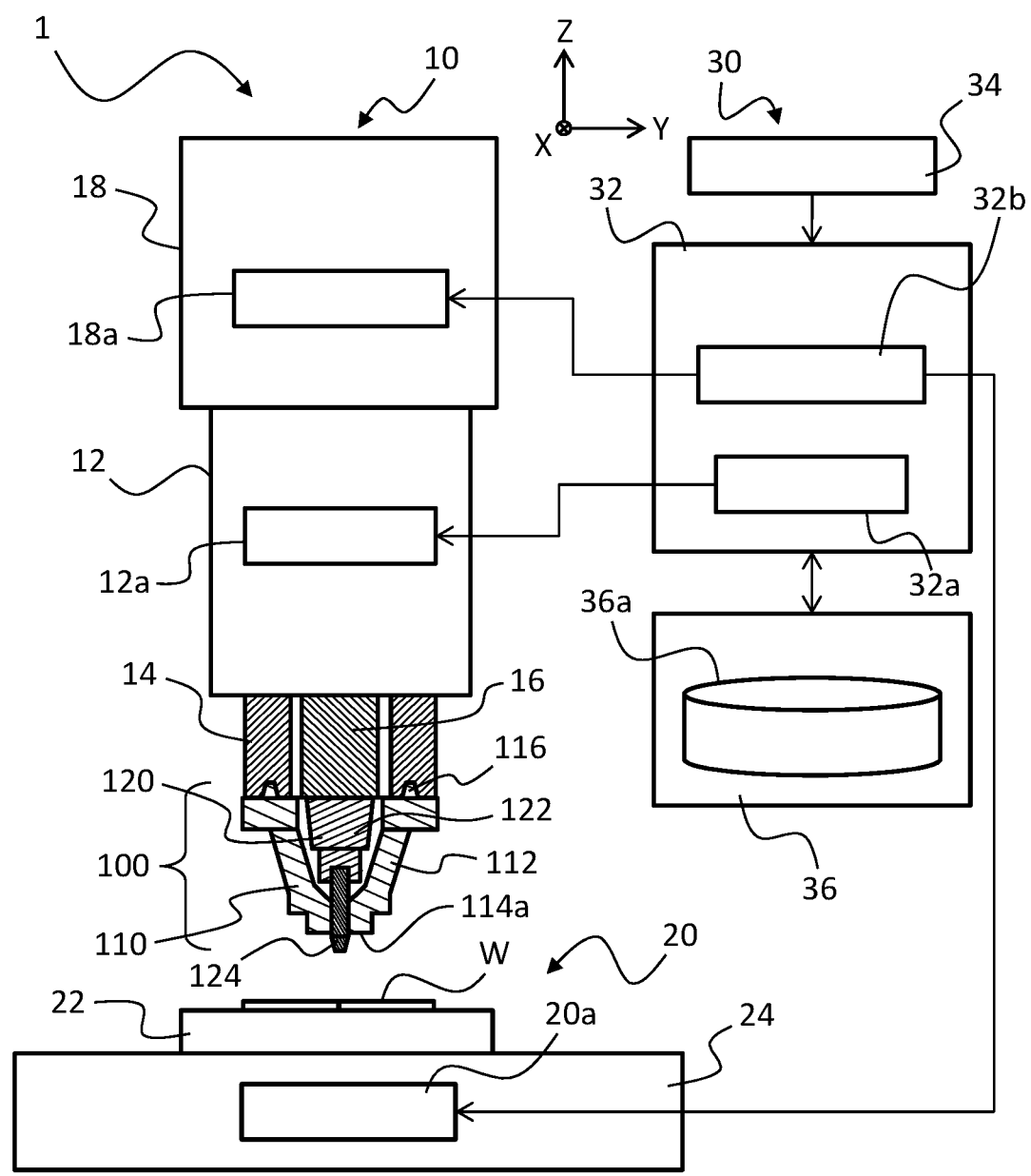
FIG. 1 is a partial cross-sectional view of a friction stir welder to which a friction stir welding tool according to embodiment 1 of the present invention is applied, illustrating a schematic of the friction stir welder.

The embodiments will now be described with reference to the accompanying drawings, wherein like reference numerals designate corresponding or identical elements throughout the various drawings.

One known technique of friction stir welding is a welder that includes: a friction stir welding tool made up of a pin and a shoulder separate from each other; and a rotating head on which the friction stir welding tool is mounted. With the shoulder kept in contact with workpieces, the pin is inserted into the workpieces while the pin is kept rotating relative to the shoulder. In this manner, the workpieces are welded together by friction stir welding (see, for example, Japanese Translation of PCT International Application Publication No. JP-T-2009-537325). An advantage of this kind of welder is that the frictional heating necessary for welding is provided by the rotation of the pin alone. Because of this advantage, this kind of welder is used in applications such as: continuous welding of butting portions of two members; and point welding (spot welding) between superimposed portions of two members.

In this kind of welder, the structure of the friction stir welding tool is that the pin is separate from the housing including the shoulder. It is, therefore, structurally inevitable for a predetermined clearance (space) to exist between the pin and the housing. Through the clearance, part of the material of the workpiece that is flowing plastically at the time of friction stir welding can enter the tool.

When the workpieces are cooled after welding, the part of the workpieces in the tool is also cooled and solidified. This may cause the workpieces to adhere to the pin and the housing, making it difficult to use the tool repeatedly. Additionally, once a workpiece enters a tool, the workpiece stays inside the tool, instead of being discharged to outside, until some amount of workpiece has accumulated in the tool. In excess of some amount, part of the workpiece that is flowing plastically leaks from between the shoulder and the workpiece and adheres to the upper surfaces of the workpieces, resulting in degradation of quality of the welded surface.

In order to eliminate such occurrence, there is a friction stir point welder improved by using a "double-action rotating tool", in which the probe (pin) and the shoulder member are separate from each other (see, for example, JP 2007-313520A). In this friction stir point welder, a plurality of discharge holes are formed on the side wall of the shoulder member, and a plurality of protrusions are formed on the outer surface of the probe. With this configuration, unnecessary material pieces entering the tool through between the probe and the shoulder member at the time of friction stir point welding are finely cut at the protrusions and discharged through the discharge holes. As far as point welding is concerned, this configuration ensures that unnecessary material pieces entering the tool are efficiently discharged to outside the tool, eliminating or minimizing adherence between the probe and the shoulder member.

However, when it comes to friction stir welders that perform continuous welding along butting portions of two workpieces, part of the workpieces continuously enter the housing through the space between the pin and the shoulder, from the start to end of welding, that is, from the time when the leading end of the pin is pressed into the butting portions until the time when the pin is removed. As a result, part of the workpieces stays in the housing in large amounts. The pin, which constitutes a part of the tool, is rotating during continuous friction stir welding. If part of the workpieces retained in the housing contacts the pin, frictional heat may occur between the rotating pin and part of the workpieces, causing the pin to be heated so excessively that the pin may be degraded in strength or the pin may be damaged eventually. These occurrences may cause a shortened service life of the tool.

The above-described friction stir point welder is capable of discharging unnecessary material pieces entering the tool through between the probe and the shoulder member. However, point welding basically does not involve movement of the tool on the welded surfaces of the workpieces, and the welding period of time per position is significantly short. Therefore, not a large amount of unnecessary material pieces enters the tool in each point welding. Under the circumstances, the friction stir point welder is capable of cutting the unnecessary material pieces in the tool using the protrusions formed on the probe and discharging resulting smaller material pieces, which are small in amount.

In the above-described tool with discharge holes, a space in which to retain unnecessary material pieces is intentionally formed between the probe and the shoulder member so that the unnecessary material pieces are finely cut in the space using the protrusions formed on the probe. If the tool with this configuration is used to perform continuous friction stir welding, frictional heat equally occurs due to contact between the probe and continuously incoming unnecessary material pieces. Thus, the above-described tool has the inherent problem that frictional heat inevitably causes degradation of strength of the probe and/or damage to the probe, leading to a shortened service life of the tool.

In light of the circumstances, the friction stir welding tools according to embodiments of the present invention each include, in the housing, a housing hole containing the stir pin and a discharge hole connected to the outside of the housing. Providing a discharge hole ensures that incoming unnecessary material pieces are continuously discharged through the discharge hole. This eliminates or minimizes degradation of strength of the probe and damage or similar occurrences to the probe, which in turn eliminates or minimizes shortening of the service life of the tool. It is to be noted that the ideas and techniques conceived of by the inventors are provided in an attempt to further the understanding of the friction stir welding tools according to the embodiments and are not intended to admit that the ideas are known in the art.

Embodiment 1

FIG. 1 is a partial cross-sectional view of a friction stir welder to which the friction stir welding tool according to embodiment 1 of the present invention is applied, illustrating a schematic of the friction stir welder. As illustrated in FIG. 1, a friction stir welding tool 100 according to embodiment 1 of the present invention is applied to a friction stir welder 1. The friction stir welder 1 includes a body 10, a workpiece carrier 20, and a controller 30.

The body 10 of the friction stir welder 1 includes a headstock 12 and a headstock feeder 18. The headstock 12 includes: a spindle frame 14; and a rotation spindle 16, which is incorporated in the spindle frame 14 and rotatable relative to the spindle frame 14. The headstock feeder 18 moves the headstock 12 in three axis directions of XYZ. The spindle frame 14, at its lower end, is fitted with a housing 110 of the friction stir welding tool 100, described later.

The rotation spindle 16 is connected with a stir pin 120 of the friction stir welding tool 100. With this configuration, in the friction stir welding tool 100 according to embodiment 1 of the present invention, the stir pin 120 is rotatable relative to the housing 110.

The workpiece carrier 20 includes: a machining table 22, on which workpieces W are placed and supported; and a machining table feeder 24, which moves the machining table 22 in the XY directions. The machining table 22 includes, on its upper surface, a clamp or another support mechanism (not illustrated) that fixes and supports workpieces W to be welded together. With the machining table feeder 24 driven into operation, the machining table 22 moves the workpieces W relative to the friction stir welding tool 100.

The controller 30 includes: a numerical controller 32, which controls motions of the friction stir welder 1 as a whole, including the headstock 12 and the machining table 22; an interface 34, which is for an operator to input machining conditions for the machining control performed by the numerical controller 32 and other conditions; and a memory 36, which stores data 36a indicating various machining programs and/or machining conditions. The numerical controller 32 includes: a rotation controller 32a, which outputs a rotation command signal to a rotation driver 12a, which is incorporated in the headstock 12 of the body 10, the rotation command signal being for controlling rotation of the friction stir welding tool 100; and a feed shaft controller 32b, which outputs a feed command signal to a feed shaft driver 18a, which is incorporated in the headstock feeder 18, the feed command signal being for controlling movement of the headstock 12. This configuration implements control of, for example, the movement of the headstock 12 and the machining table 22 relative to each other, the number of rotations of the friction stir welding tool 100 during welding, and the depth over which the tool is inserted in the workpieces W.

The friction stir welding tool 100 according to embodiment 1 of the present invention includes: the housing 110, which is attached to the lower end of the spindle frame 14; and the stir pin 120, which is attached to the rotation spindle 16. The housing 110 includes a housing body 112. On the upper end, the housing body 112 includes an attached portion 116, which is fitted with the spindle frame 14. On the lower end, the housing body 112 includes a first surface (shoulder surface) 114a, which contacts the workpieces W in a non-rotating state. The stir pin 120 includes: a pin holder 122, which is attached to the rotation spindle 16; and a pin body 124, which is detachably attached to the pin holder 122. With this configuration, the stir pin 120 extends along rotation axis C.

Figure 2A:
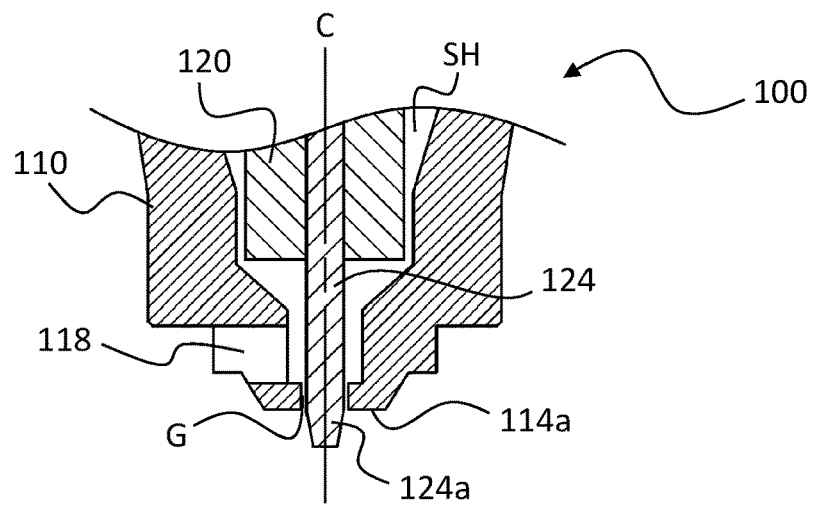
FIG. 2A a cross-sectional view of the friction stir welding tool according to embodiment 1 of the present invention, illustrating specific features of main components of the friction stir welding tool and illustrating a schematic of the leading end of the tool in operation.
Figure 2B:
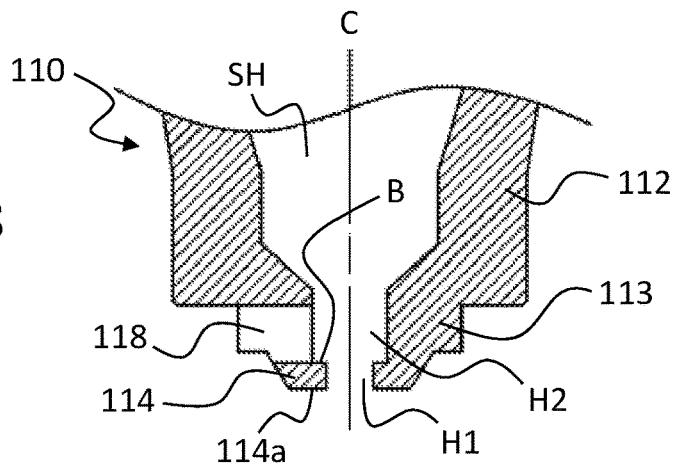
FIG. 2B a cross-sectional view of the friction stir welding tool according to embodiment 1 of the present invention, illustrating specific features of main components of the friction stir welding tool and illustrating a schematic of portions around the leading end of a housing.
Figure 2C:
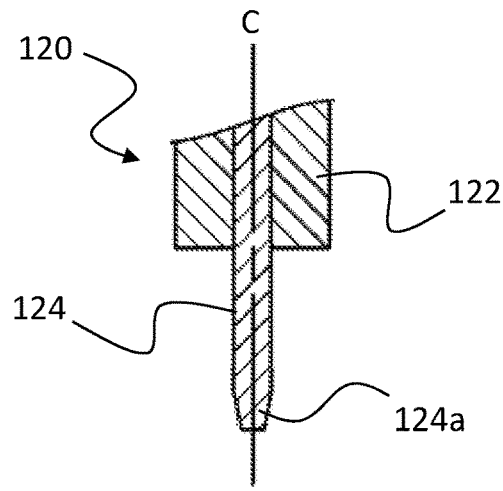
FIG. 2C is a cross-sectional view of the friction stir welding tool according to embodiment 1 of the present invention, illustrating specific features of main components of the friction stir welding tool and illustrating a schematic of a stir pin, which is contained in the housing.

FIGS. 2A to 2C each are a cross-sectional view of the friction stir welding tool according to embodiment 1 of the present invention, illustrating specific features of main components of the friction stir welding tool. FIG. 2A illustrates a schematic of the leading end of the tool in operation. FIG. 2B illustrates a schematic of portions around the leading end of the housing. FIG. 2C illustrates a schematic of the stir pin, which is contained in the housing. As illustrated in FIG. 2A, the friction stir welding tool 100 according to embodiment 1 of the present invention has a housing hole SH, which is formed in the housing 110 and extends between the upper end of the friction stir welding tool 100, which is attached to the spindle frame 14, and the lower end of the friction stir welding tool 100, where the first surface 114a is funned.

The housing hole SH contains the stir pin 120 rotatably about the rotation axis C relative to the housing 110, and is open on the first surface 114a. The stir pin 120 includes a stir portion 124a at one end of the stir pin 120 along the rotation axis C. The stir portion 124a is contained in the housing hole SH, and protrudes through and beyond the first surface 114a so that the stir portion 124a is inserted into the workpieces. The housing 110 has a discharge hole 118, through which the housing hole SH and the outside of the housing 110 are connected to each other.

As illustrated in FIG. 2B, the housing 110 has a first surface 114a, which is located at the lower end of the housing body 112 and which is to contact the upper surfaces of the workpieces W. The housing hole SH of the housing body 112 includes a first housing hole H1 and a second housing hole H2, which are connected to each other. The first housing hole H1 is located at the first surface 114a side relative to the second housing hole H2 and is open on the first surface 114a. The second housing hole H2 is located at the rotation spindle 16 side relative to the first housing hole H1.

The first surface 114a preferably has a smaller contact area that contacts the workpieces W than the projected area of the housing 110. As an example smaller contact area, the housing body 112 has, at its lower end, a smaller diameter portion 113, which has a smaller outer diameter. Further, a tapered protrusion 114, which is tapered from a lower portion toward the leading end of the smaller diameter portion 113. The first surface 114a, which is located at one end of the protrusion 114, serves as a shoulder surface that contacts the workpieces at the time of friction stir welding.

In the protrusion 114, the first housing hole H1, which is connected to the second housing hole H2, is formed, and the protrusion 114 contains part of the pin body 124 of the stir pin 120. As an example of this configuration, the first housing hole H1 and the second housing hole H2 each have a hole diameter larger than the outer diameter of the pin body 124 of the stir pin 120, described later. The second housing hole H2 has a hole diameter larger than the hole diameter of the first housing hole H1.

A feature of the friction stir welding tool 100 according to embodiment 1 of the present invention is that the discharge hole 118 is formed in the housing body 112 and connects the housing hole SH to the outside of the housing body 112. The discharge hole 118 is preferably formed at a position including boundary B between the first housing hole H1 and the second housing hole H2. The discharge hole 118 may be formed by drilling and/or milling of the housing body 112 to make an additional hole penetrating the housing body 112.

As illustrated in FIG. 2C, the stir pin 120 has such a configuration that the pin body 124, which includes the stir portion 124a at one end of the pin body 124, is separate from a pin holder 122. The pin body 124 is attached to the pin holder 122 at the other end of the pin body 124 relative to the stir portion 124a along the rotation axis C. As illustrated in FIG. 2A, the stir pin 120 is rotatably contained in the housing hole SH of the housing body 112. The pin body 124 rotates about the rotation axis C, and the stir portion 124a, which is located at one end of the pin body 124, is pressed into the workpieces W. With the pin body 124 and the stir portion 124a in this state, the pin body 124 moves relative to the workpieces W. In this manner, friction stir welding is performed. This involves such a structure that the housing 110 makes a non-rotating contact with the workpieces W and that the stir pin 120 rotates relative to the housing 110. With this structure, there occurs a predetermined amount of gap (clearance) G between the inner surface of the first housing hole H1 and the outer surface of the pin body 124.

Figure 3:
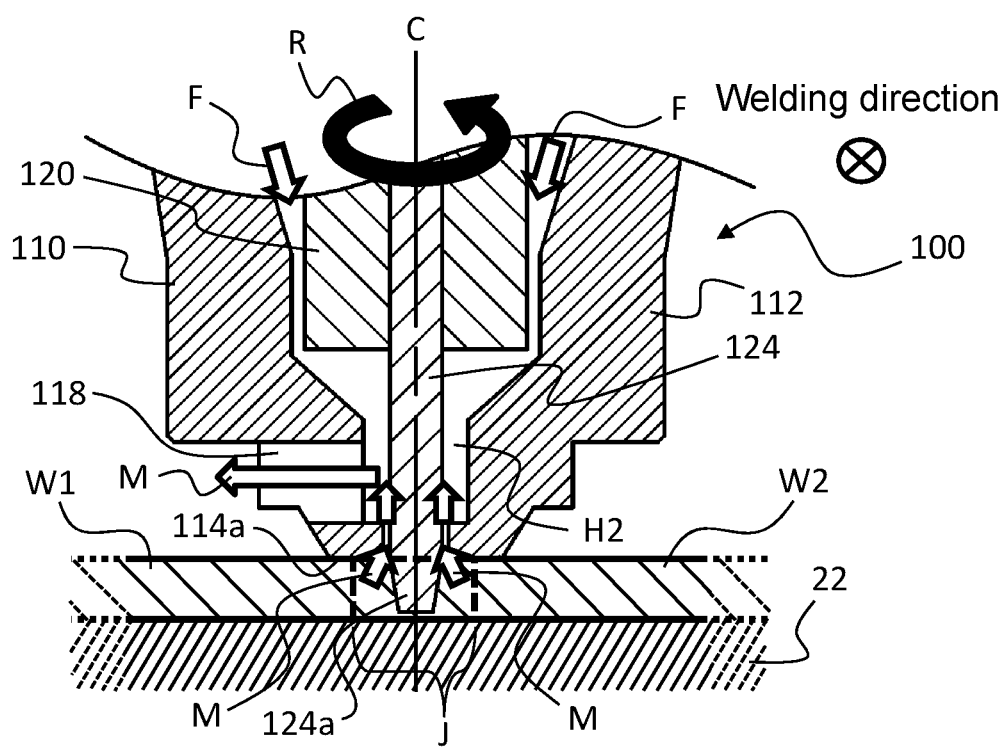
FIG. 3 is a cross-sectional view illustrating a schematic of butting portions of two metal plates welded together by friction stir welding using the friction stir welding tool according to embodiment 1 of the present invention.

FIG. 3 is a cross-sectional view illustrating a schematic of butting portions of two metal plates welded together by friction stir welding using the friction stir welding tool according to embodiment 1 of the present invention. As illustrated in FIG. 3, two workpieces W1 and W2, which are metal plates, are fixed and supported on the machining table 22 with end surfaces of the workpieces W1 and W2 butting each other. When the workpieces W1 and W2 in this state are welded together by friction stir welding, the stir pin 120 of the friction stir welding tool 100 is caused to rotate about the rotation axis C in, for example, the illustrated rotation direction R. With the stir pin 120 kept rotating, the stir portion 124a of the pin body 124 is pressed into the butting portions of the two workpieces W1 and W2 to a depth at which the first surface 114a of the housing body 112 contacts the workpieces W1 and W2. With the pin body 124 and the housing body 112 in this state, the tool or the workpieces are caused to move relative to each other in a direction orthogonal to the surface of the drawing along the surfaces of the butting portions of the workpieces W1 and W2. After the movement, a welded portion J is formed at the butting portions, as a result of the friction stir welding.

In this respect, the first surface 114a of the housing body 112 contacts, as a shoulder surface, the upper surfaces of the butting portions of the workpieces W1 and W2, and the stir portion 124a of the pin body 124 are inserted into the butting portions. This friction stir welding causes frictional heat, softening some of the material of the workpieces W1 and W2. Then, some of the softened material becomes excess metal M, which attempts to flow plastically beyond the upper surfaces of the butting portions. The excess metal M corresponds to: the volume of the portion of the housing body 112 embedded in the workpieces W1 and W2; and the volume of the portion of the stir portion 124a inserted in the butting portions. In the case of using a typical welding tool with the pin and the shoulder integral to each other, the excess metal M leaks on the outer sides of the shoulder, resulting in "burrs" on the welded surface.

Contrarily, in the friction stir welding tool 100 according to embodiment 1 of the present invention, the pin and the shoulder are separate from each other. Although part of the excess metal M may result in "burrs", similarly to the above-described case, a large part of the excess metal M passes through the gap G, which is between the first housing hole H1 and the pin body 124 as illustrated in FIG. 2A, and enters the second housing hole H2 of the housing hole SH, which is formed in the housing body 112. The amount of the excess metal M that passes through the gap G is adjusted by changing, depending on the shape of the pin body 124 determined by welding conditions, the housing to another housing having a different hole diameter of the first housing hole H1.

In the friction stir welding tool 100 according to embodiment 1 of the present invention, the discharge hole 118 is formed to connect the second housing hole H2 of the housing hole SH of the housing body 112 to the outside of the housing body 112. Through the discharge hole 118, the excess metal M entering the second housing hole H2 is discharged to outside the housing body 112, as described above. This configuration ensures that even if the excess metal M, which is part of the workpieces W1 and W2, continuously enters the housing hole SH of the housing 110 of the friction stir welding tool 100 during continuous friction stir welding, the excess metal M is prevented from staying in the housing hole SH (especially the second housing hole H2). This eliminates or minimizes frictional heating between the pin body 124 of the stir pin 120 and the excess metal M.

Additionally, the hole diameter of the second housing hole H2 is larger than the hole diameter of the first housing hole H1. This configuration makes the excess metal M entering the housing hole SH easier to discharge outside, because the increase in the hole diameter of the housing hole SH causes a flow to occur in a direction away from the rotation axis C and because the stir pin 120 that is rotating during welding causes centrifugal force. In this respect, the discharge hole 118 is formed at a position including the boundary B between the first housing hole H1 and the second housing hole H2. This configuration causes the excess metal M to be discharged to outside the housing body 112 continuously and smoothly, instead of allowing the excess metal M to stay in the second housing hole H2 and the discharge hole 118.

While the excess metal M is passing through the discharge hole 118, the excess metal M is gradually cooled into solid state and discharged to outside in the form of burrs. This configuration prevents the excess metal M from adhering to the workpieces M, and eliminates or minimizes degradation of welded surface quality. In order to discharge the excess metal M more continuously and more smoothly, it is possible to form the discharge hole 118 such that the plastically flowing excess metal M, which is part of the workpieces W, is guided by a flow occurring by rotation of the stir pin 120 and is discharged from the housing hole SH to outside the housing 110.

In the housing body 112, a coating film (not illustrated) having a low degree of affinity with the material constituting the workpieces W may be formed. For example, such coating film may be formed on the first surface 114a, the inner surface of the first housing hole H1, the inner surface of the second housing hole H2 of the housing hole SH, and/or the pin body 124. This configuration prevents the excess metal M from adhering to the housing 110 and/or the stir pin 120.

Also as illustrated in FIG. 3, a gas flow supply mechanism (not illustrated) may be provided in, for example, the spindle frame 14 of the headstock 12, to which the housing 110 is attached. The gas flow supply mechanism supplies gas flow F into the housing hole SH of the housing 110. This configuration keeps the housing 110 and the stir pin 120 cooled during welding, and also cools the excess metal M entering the housing hole SH, promoting external discharge of the excess metal M.

Thus, the friction stir welding tool 100 according to embodiment 1 of the present invention is a separate type tool in which the housing body 112 is provided with the discharge hole 118, which connects the housing hole SH to the outside of the housing body 112. The separate type tool has such a configuration that the pin body 124 protrudes through and beyond the first housing hole H1 on the first surface 114a of the housing body 112; rotates relative to the housing body; and is inserted into the workpieces W. Providing the discharge hole 118 ensures that even when the excess metal M, which is part of the workpieces W, has entered the housing body 112 through the gap G between the first housing hole H1 and the pin body 124, the excess metal M is efficiently discharged to outside the tool. This eliminates or minimizes excessive frictional heating between the pin body 124 and the excess metal M in the housing hole SH, which is formed in the housing 110. This, as a result, eliminates or minimizes degradation of strength of the pin body 124 and damage or similar occurrences to the pin body 124.

Also in embodiment 1, the pin body 124 and the pin holder 122 of the stir pin 120 are separate from each other. The pin body 124 includes the stir portion 124a, which keeps contact with the workpieces W during friction stir welding. The separate configuration enables the pin body 124 alone to be replaced as a consumable product, eliminating or minimizing damage to the stir pin 120 itself. Making the pin body 124 alone replaceable as a consumable product also results in a reduction in running cost of the friction stir welding tool.

Embodiment 2

Next, by referring to FIGS. 4 and 5, a friction stir welding tool according to embodiment 2 of the present invention will be outlined. In the following description, the friction stir welder to which the friction stir welding tool according to embodiment 2 is applied is similar in configuration to embodiment 1 except in the configuration of the friction stir welding tool including the detachable shoulder, and description of the friction stir welder will not be repeated here.

Figure 4A:
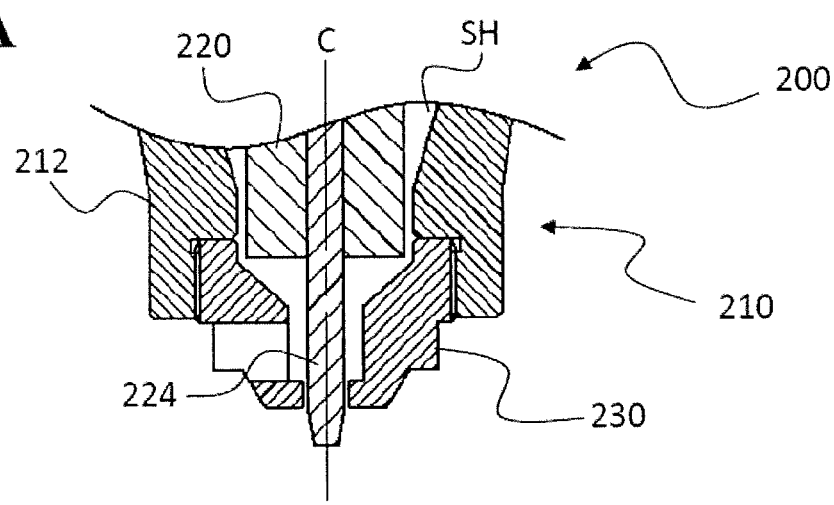
FIG. 4A is a cross-sectional view of a friction stir welding tool according to embodiment 2 of the present invention, illustrating specific features of main components of the friction stir welding tool and illustrating a schematic of the leading end of the tool in operation.
Figure 4B:
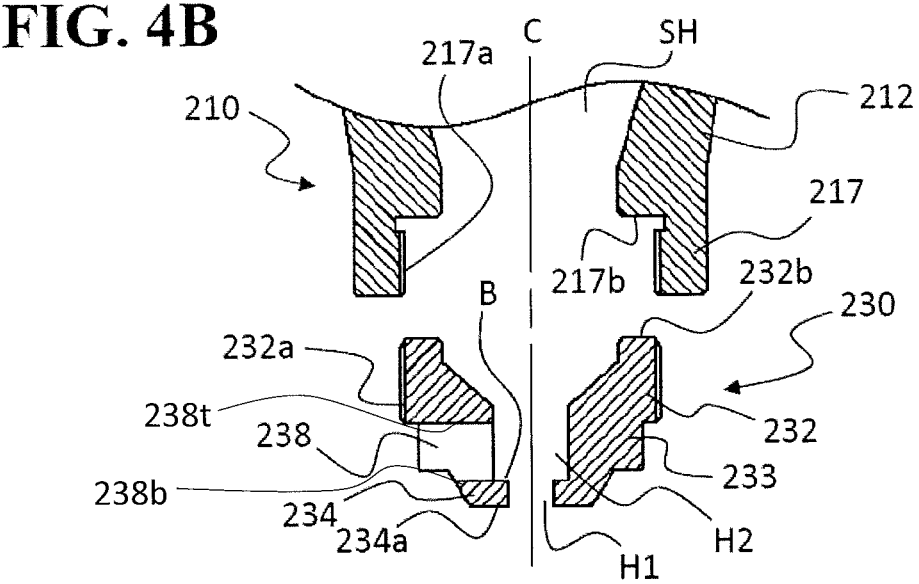
FIG. 4B is a cross-sectional view of the friction stir welding tool according to embodiment 2 of the present invention, illustrating specific features of main components of the friction stir welding tool and illustrating a schematic of an attachment structure in which a housing body and a shoulder are attached to each other.

FIGS. 4A and 4B are cross-sectional views of the friction stir welding tool according to embodiment 2 of the present invention, illustrating specific features of main components of the friction stir welding tool. FIG. 4A illustrates a schematic of the leading end of the tool in operation. FIG. 4B illustrates a schematic of an attachment structure in which the housing body and the shoulder are attached to each other. As illustrated in FIG. 4A, a friction stir welding tool 200 according to embodiment 2 of the present invention includes: a housing 210, which is fitted with the spindle frame 14 illustrated in FIG. 1; and a stir pin 220, which is connected to the rotation spindle 16. The housing 210 has such a configuration that a housing body 212 and a shoulder 230, which is detachably attached to the lower end of the housing body 212, are separate from each other. With the shoulder 230 attached to the housing body 212, a housing hole SH is defined in the housing body 212 and the shoulder 230. The stir pin 220 is rotatably contained in the housing hole SH. The stir pin 220 includes a pin body 224, which is detachably attached to the stir pin 220 and extends along the rotation axis C.

As illustrated in FIG. 4B, the housing 210 includes a holding portion 217 at the housing body 212. The holding portion 217 is open at its lower end to hold the shoulder 230, described later. The holding portion 217 of the housing body 212 includes: a holding surface 217a, which holds a held surface 232a of the shoulder 230; and a contact surface 217b, to which a positioning surface 232b contacts, the positioning surface 232b being located at the upper end of the shoulder 230. An example of the holding surface 217a is an internal thread.

The shoulder 230 includes: an attached portion 232, which includes the positioning surface 232b, which contacts the contact surface 217b of the housing body 212; a smaller diameter portion 233, which continues from the attached portion 232 in a height direction; and a tapered protrusion 234, which is tapered from the smaller diameter portion 233 toward the leading end of the smaller diameter portion 233. The attached portion 232, the smaller diameter portion 233, and the tapered protrusion 234 are integral to each other. A first surface 234a is located at one end of the protrusion 234 and serves as a shoulder surface that contacts the workpieces at the time of friction stir welding.

The attached portion 232 has an outer shape that serves as an attachment structure corresponding to the holding surface 217a of the housing body 212. An example of the held surface 232a of the attached portion 232 is an external thread. In the shoulder 230, a second housing hole H2 is formed. The second housing hole H2 constitutes part of the housing hole SH of the housing 210.

In the protrusion 234, a first housing hole H1 is Ruined. The first housing hole H1 is connected to the second housing hole H2 and is open on the first surface 234a. Part of the pin body 224 of the stir pin 220 is contained in the first housing hole H1. Similarly to embodiment 1, the first housing hole H1 and the second housing hole H2 each have a hole diameter larger than the outer diameter of the pin body 224. The second housing hole 142 has a hole diameter larger than the hole diameter of the first housing hole H1.

In the friction stir welding tool 200 according to embodiment 2 of the present invention, the shoulder 230 has a discharge hole 238, which connects the housing hole SH to the outside of the shoulder 230. Similarly to embodiment 1, the discharge hole 238 is preferably formed at a position at least including the boundary B between the first housing hole H1 and the second housing hole H2. As illustrated in FIG. 4B, the discharge hole 238 is defined by a top surface 238t and a bottom surface 238b.

Figure 5A:
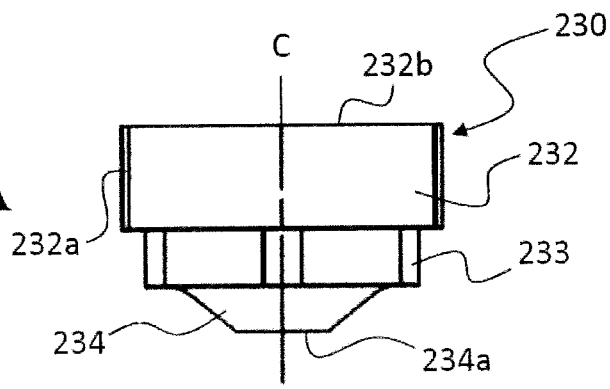
FIG. 5A is a side view of the shoulder illustrated in FIG. 4B, illustrating a specific configuration of the shoulder.
Figure 5B:
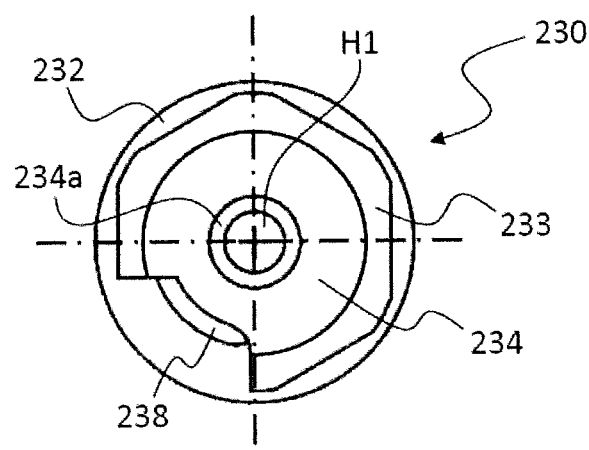
FIG. 5B is a bottom side view of the shoulder illustrated in FIG. 4B, illustrating a specific configuration of the shoulder.
Figure 5C:
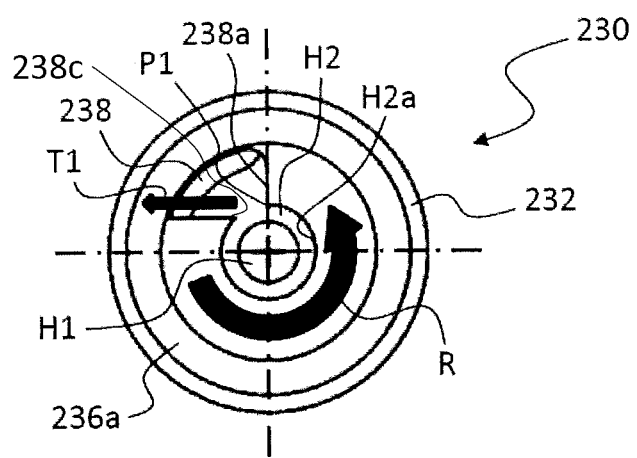
FIG. 5C is a top side view of the shoulder illustrated in FIG. 4B, illustrating a specific configuration of the shoulder.

FIGS. 5A to 5C illustrate a specific configuration of the shoulder illustrated in FIG. 4B. FIG. 5A is a side view of the shoulder, FIG. 5B is a bottom side view of the shoulder, and FIG. 5C is a top side view of the shoulder. As illustrated in FIG. 5A, the shoulder 230 has such a configuration that the attached portion 232, the smaller diameter portion 233, and the protrusion 234 are integral to each other. The lower end surface of the protrusion 234 corresponds to the first surface 234a. On the held surface 232a of the attached portion 232, an external thread is formed. At the upper end of the attached portion 232, the positioning surface 232b is formed. The positioning surface 232b contacts the contact surface 217b of the housing body 212.

As illustrated in FIGS. 5B and 5C, the discharge hole 238 is formed by cutting part of the shoulder 230 such that the housing hole SH is connected to the outside of the shoulder 230. In this respect, it is possible to form the discharge hole 238 such that the plastically flowing excess metal M, which is part of the workpieces W, is guided by a flow occurring by rotation of the stir pin 220 and is discharged from the second housing hole H2 to outside the shoulder 230.

As an example of this configuration, the shoulder 230 includes a connection position P1. The connection position P1 is where the inner surface, 238a, of the discharge hole 238 and the inner surface, H2a, of the second housing hole H2 are connected to each other in the rotation direction, R, of the stir pin 220. The discharge hole 238 includes the tangent direction, T1, of the inner circumference of the second housing hole H2 at the connection position P1. An additional inner surface 238c of the discharge hole 238 is provided to define the discharge hole 238. This configuration ensures that the excess metal M is discharged outside continuously and smoothly by the rotation of the pin body 224 during welding.

As illustrated in FIG. 5B, the smaller diameter portion 233 has an outer surface that has a rectangular cylinder shape, for example (a hexagonal cylinder shape in the embodiment of FIG. 5B). This configuration makes the smaller diameter portion 233 easily graspable in screwing the attached portion 232 of the shoulder 230 into the holding portion 217 of the housing body 212.

With the above-described configuration, the friction stir welding tool 200 according to embodiment 2 of the present invention provides the following advantageous effects, in addition to the advantageous effects obtained in embodiment 1. The shoulder 230 is attachable and detachable to and from the leading end of the housing body 212 of the housing 210. This structure ensures that if, for example, the first surface 234a is damaged through wear as a result of continued contact with the workpieces W during friction stir welding, the shoulder 230 alone is replaceable as a consumable product, resulting in a reduction in running cost of the friction stir welding tool. Also, since it is not necessary to replace the housing 210 as a whole, the labor of replacing the tool is saved. Further, the amount of the excess metal M that enters the housing hole SH can be adjusted by changing, depending on the shape of the pin body 224 determined by welding conditions, the housing to another housing having a different hole diameter of the first housing hole H1.

Embodiment 3

Next, by referring to FIG. 6, a friction stir welding tool according to embodiment 3 of the present invention will be outlined. In the following description, the friction stir welder to which the friction stir welding tool according to embodiment 3 is applied is similar in configuration to embodiment 1 except in the configuration of the friction stir welding tool including the detachable shoulder, and description of the friction stir welder will not be repeated here.

Figure 6A:
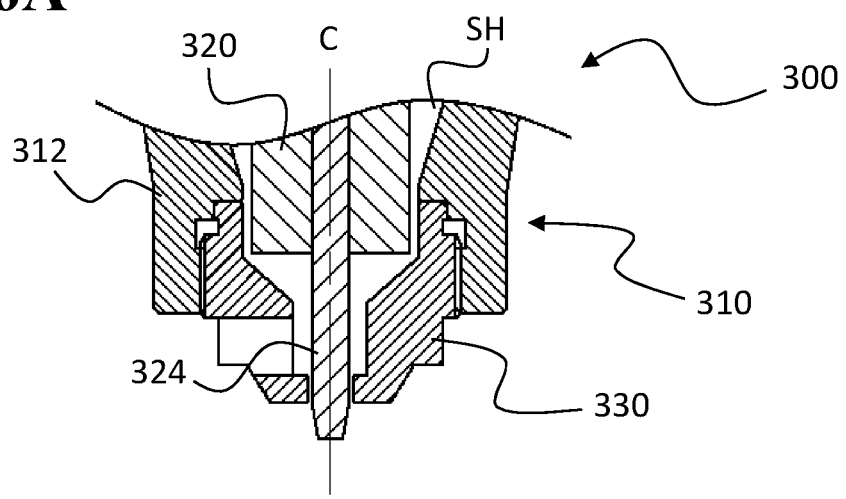
FIG. 6A is a cross-sectional view of a friction stir welding tool according to embodiment 3 of the present invention, illustrating specific features of main components of the friction stir welding tool and illustrating a schematic of the leading end of the tool in operation.
Figure 6B:
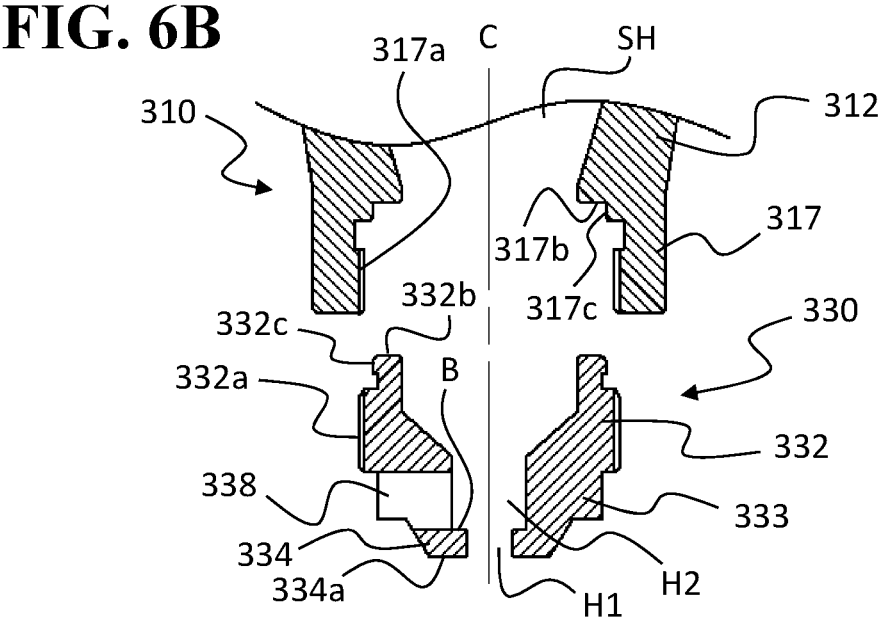
FIG. 6B is a cross-sectional view of the friction stir welding tool according to embodiment 3 of the present invention, illustrating specific features of main components of the friction stir welding tool and illustrating a schematic of an attachment structure in which a housing body and a shoulder are attached to each other.

FIGS. 6A and 6B each are a cross-sectional view of the friction stir welding tool according to embodiment 3 of the present invention, illustrating specific features of main components of the friction stir welding tool. FIG. 6A illustrates a schematic of the leading end of the tool in operation. FIG. 6B illustrates a schematic of an attachment structure in which the housing body and the shoulder are attached to each other. As illustrated in FIG. 6A, a friction stir welding tool 300 according to embodiment 3 of the present invention includes: a housing 310, which is fitted with the spindle frame 14 illustrated in FIG. 1; and a stir pin 320, which is connected to the rotation spindle 16. The housing 310 has such a configuration that a housing body 312 and a shoulder 330, which is detachably attached to the lower end of the housing body 312, are separate from each other. With the shoulder 330 attached to the housing body 312, a housing hole SH is defined in the housing body 312 and the shoulder 330. The stir pin 320 is rotatably contained in the housing hole SH.

As illustrated in FIG. 6B, the housing 310 includes a holding portion 317 at the housing body 312. The holding portion 317 is open at its lower end to hold the shoulder 330, described later. The holding portion 317 of the housing body 312 includes: a holding surface 317a, which holds the held surface, 332a, of the shoulder 330; an upper contact surface 317b, to which an upper positioning surface 332b contacts, the upper positioning surface 332b determining the position of the shoulder 330 in the direction of the rotation axis, C, of the shoulder 330; and a side contact surface 317c, to which a side positioning surface 332c contacts, the side positioning surface 332c determining the position of the shoulder 330 in the radial direction of the rotation axis C of the shoulder 330. An example of the holding surface 317a is an internal thread.

The shoulder 330 includes: an attached portion 332, which includes the held surface 332a, the upper positioning surface 332b, and the side positioning surface 332c; a smaller diameter portion 333, which continues from the attached portion 332 in a height direction; and a tapered protrusion 334, which is tapered from the smaller diameter portion 333 toward the leading end of the smaller diameter portion 333. The attached portion 332, the smaller diameter portion 333, and the tapered protrusion 334 are integral to each other. A first surface 334a is located at one end of the protrusion 334 and serves as a shoulder surface that contacts the workpieces at the time of friction stir welding.

In the shoulder 330, a second housing hole H2 is formed. The second housing hole H2 constitutes part of the housing hole SH of the housing 310. In the protrusion 334, a first housing hole H1 is formed. The first housing hole H1 connects the second housing hole H2 to the outside of the shoulder 330. Similarly to embodiment 1, the first housing hole H1 and the second housing hole H2 each have a hole diameter larger than the outer diameter of the pin body 324. The second housing hole H2 has a hole diameter larger than the hole diameter of the first housing hole H1.

The attached portion 332 has an outer shape that serves as an attachment structure corresponding to the holding portion 317 of the housing body 312. An example of the held surface 332a of the attached portion 332 is an external thread. The upper positioning surface 332b, which is located at the upper end of the attached portion 332, contacts the upper contact surface 317b of the housing body 312 to determine the position of the shoulder 330 in the direction in which the rotation axis C of the shoulder 330 is pointed. The side positioning surface 332c, which is located at a side of an upper portion of the attached portion 332, contacts the side contact surface 317c of the housing body 312 to determine the position of the shoulder 330 in the radial direction of the rotation axis C of the shoulder 330.

In the friction stir welding tool 300 according to embodiment 3 of the present invention, the shoulder 330 has a discharge hole 338, which connects the housing hole SH to the outside of the shoulder 330. Similarly to embodiment 2, the discharge hole 338 is preferably formed at a position at least including the boundary B between the second housing hole H2 and the first housing hole H1. It is possible to form the discharge hole 338 such that the plastically flowing excess metal, which is part of the workpieces, is guided by a flow occurring by rotation of the stir pin 320 and is discharged from the second housing hole H2 to outside the shoulder 330.

With the above-described configuration, the shoulder 330 of the friction stir welding tool 300 according to embodiment 3 of the present invention includes: the upper positioning surface 332b, which contacts the upper contact surface 317b of the housing body 312; and the side positioning surface 332c, which contacts the side contact surface 317c of the housing body 312. This provides the following advantageous effects, in addition to the advantageous effects obtained in embodiments 1 and 2. The side positioning surface 332c, which contacts the side contact surface 317c of the housing body 312, has a fitting structure. The fitting structure ensures that at the time when the shoulder 330 is attached to the housing body 312, the shoulder 330 is accurately positioned relative to the housing body 312 in the direction in which the rotation axis C is pointed and in the radial direction of the rotation axis C. As a result, even when the shoulder 330 is replaced, the above configuration easily makes welding quality remain approximately the same before and after the shoulder 330 is replaced.

Embodiment 4

Next, by referring to FIG. 7, a friction stir welding tool according to embodiment 4 of the present invention will be outlined. In the following description, the friction stir welder to which the friction stir welding tool according to embodiment 4 is applied is similar in configuration to embodiment 1 except in the configuration of the friction stir welding tool including the detachable shoulder, and description of the friction stir welder will not be repeated here.

Figure 7A:
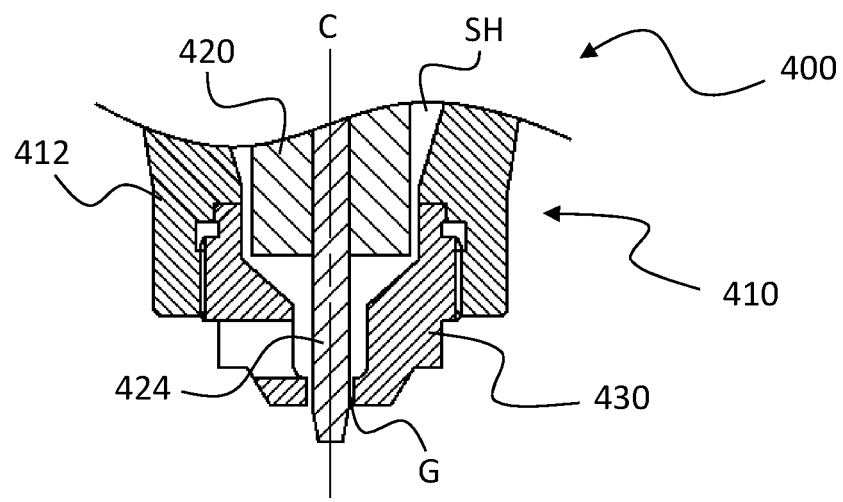
FIG. 7A is a cross-sectional view of a friction stir welding tool according to embodiment 4 of the present invention, illustrating specific features of main components of the friction stir welding tool and illustrating a schematic of the leading end of the tool in operation.
Figure 7B:
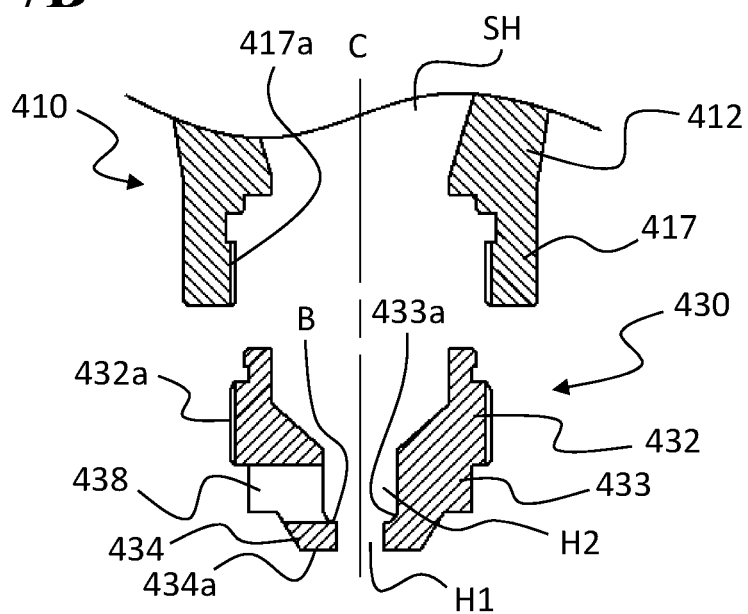
FIG. 7B is a cross-sectional view of the friction stir welding tool according to embodiment 4 of the present invention, illustrating specific features of main components of the friction stir welding tool and illustrating a schematic of an attachment structure in which a housing body and a shoulder are attached to each other.

FIGS. 7A and 7B each are a cross-sectional view of the friction stir welding tool according to embodiment 4 of the present invention, illustrating specific features of main components of the friction stir welding tool. FIG. 7A illustrates a schematic of the leading end of the tool in operation. FIG. 7B illustrates a schematic of an attachment structure in which the housing body and the shoulder are attached to each other. As illustrated in FIG. 7A, a friction stir welding tool 400 according to embodiment 4 of the present invention includes: a housing 410, which is attached to the spindle frame 14 illustrated in FIG. 1; and a stir pin 420, which is connected to the rotation spindle 16.

Similarly to embodiments 2 and 3, the housing 410 has such a configuration that a housing body 412 and a shoulder 430, which is detachably attached to the lower end of the housing body 412, are separate from each other. With the shoulder 430 attached to the housing body 412, a housing hole SH is defined in the housing body 412 and the shoulder 430. The stir pin 420 is rotatably contained in the housing hole SR As illustrated in FIG. 7B, the housing 410 includes a holding portion 417 at the housing body 412, similarly to embodiment 3. The holding portion 417 is open at its lower end to hold the shoulder 430 on the inner surface of the holding portion 417.

Similarly to embodiment 3, the shoulder 430 includes: an attached portion 432, which is attached to the housing body 412; a smaller diameter portion 433, which continues from the attached portion 432 in a height direction; and a tapered protrusion 434, which is tapered from the smaller diameter portion 433 toward the leading end of the smaller diameter portion 433. The attached portion 432, the smaller diameter portion 433, and the tapered protrusion 434 are integral to each other. A first surface 434a is located at one end of the protrusion 434 and serves as a shoulder surface that contacts the workpieces at the time of friction stir welding. In the shoulder 430, a second housing hole H2 is formed. The second housing hole H2 constitutes part of the housing hole SH of the housing 410. In the protrusion 434, a first housing hole H1 is formed. The first housing hole H1 is connected to the second housing hole H2 and is open on the first surface 434a.

As an example of this configuration, similarly to embodiment 1, the first housing hole H1 and the second housing hole H2 each have a hole diameter larger than the outer diameter of the pin body 424. The second housing hole H2 has a hole diameter larger than the hole diameter of the first housing hole H1. Also in the friction stir welding tool 400 according to embodiment 4, a curved surface 433a is formed at the lower end of the second housing hole H2, which constitutes part of the housing hole SH. The curved surface 433a constitutes a smoothly diminishing portion of the second housing hole H2 at which the diameter of the second housing hole H2 smoothly diminishes toward the boundary B between the first housing hole H1 and the second housing hole H2. This configuration ensures that even if excess metal M has entered the housing hole SH, the excess metal M is prevented from accumulating at the lower portion of the second housing hole H2.

In the friction stir welding tool 400 according to embodiment 4 of the present invention as well, the shoulder 430 includes a discharge hole 438, which connects the housing hole SH to the outside of the shoulder 430. Similarly to embodiment 3, the discharge hole 438 is preferably formed at a position at least including the boundary B between the first housing hole H1 and the second housing hole H2. It is possible to form the discharge hole 438 such that the plastically flowing excess metal M, which is part of the workpieces, is guided by a flow occurring by rotation of the stir pin 420 and is discharged from the second housing hole H2 to outside the shoulder 430.

With the above-described configuration, the friction stir welding tool 400 according to embodiment 4 of the present invention provides the following advantageous effects, in addition to the advantageous effects of provided in embodiments 1 to 3. The curved surface 433a is formed at the lower end of the second housing hole H2, which constitutes part of the housing hole SH of the shoulder 430. The curved surface 433a constitutes a smoothly diminishing portion of the second housing hole H2 at which the diameter of the second housing hole H2 smoothly diminishes toward the boundary B between the first housing hole H1 and the second housing hole H2. This configuration prevents the excess metal M entering the shoulder 430 through the gap G between the pin body 424 and the first housing hole H1 from staying at the lower portion of the second housing hole H2.

Embodiment 5

Figure 8:
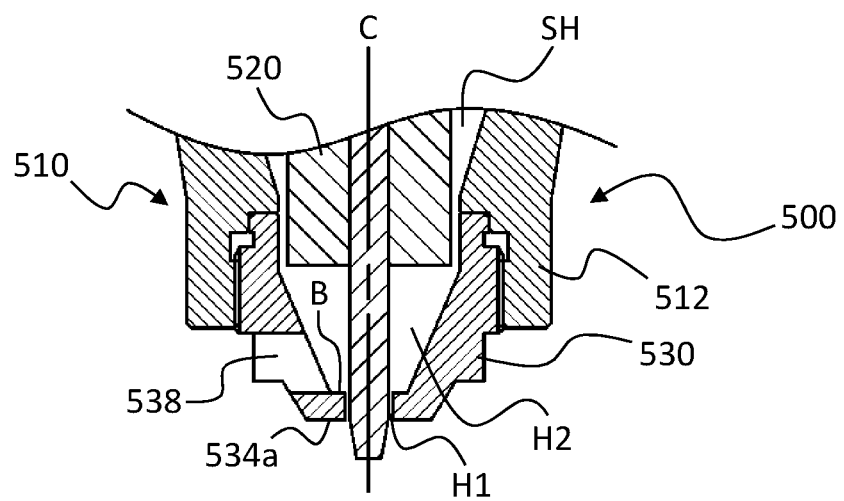
FIG. 8 is a cross-sectional view illustrating a schematic of the leading end of the friction stir welding tool according to embodiment 5 of the present invention in operation.

FIG. 8 is a cross-sectional view illustrating a schematic of the leading end of the friction stir welding tool according to embodiment 5 of the present invention in operation. In the following description, the friction stir welder to which the friction stir welding tool according to embodiment 5 is applied is similar in configuration to embodiment 1 except in the configuration of the friction stir welding tool including the detachable shoulder, and description of the friction stir welder will not be repeated here.

As illustrated in FIG. 8, a friction stir welding tool 500 according to embodiment 5 of the present invention includes: a housing 510, which is fitted with the spindle frame 14 illustrated in FIG. 1; and a stir pin 520, which is connected to the rotation spindle 16. Similarly to embodiments 2 and 3, the housing 510 has such a configuration that a housing body 512 and a shoulder 530, which is detachably attached to the lower end of the housing body 512, are separate from each other. With the shoulder 530 attached to the housing body 512, a housing hole SH is defined in the housing body 512 and the shoulder 530. The stir pin 520 is rotatably contained in the housing hole SH.

In the friction stir welding tool 500 according to embodiment 5 of the present invention, an approximately tapered second housing hole H2 is formed in the shoulder 530. The second housing hole H2 diminishes in diameter toward a lower portion of the shoulder 530. The shoulder 530 includes a discharge hole 538, which connects the second housing hole H2 to the outside of the shoulder 530. The shoulder 530 has a first surface 534a, which keeps contact with the workpieces W. In light of this structure, in a typical friction stir welding tool, the shoulder 530 including the first surface 534a is made of a metal material such as steel. In many applications, the outer surface and the inner surface of the shoulder 530 are machined by mechanical working such as turning. The shoulder 530 of the modification illustrated in FIG. 8 may be subjected to turning to form a large tapered inner surface.

With the above-described configuration, the friction stir welding tool 500 according to embodiment 5 of the present invention provides the following advantageous effects, in addition to the advantageous effects of provided in embodiments 1 to 4. The discharge hole 538 is connected to the outside of the shoulder 530 through the approximately tapered second housing hole H2. This configuration prevents the excess metal (see reference numeral M in FIG. 3) entering the second housing hole H2 from staying at a lower portion of the second housing hole H2. The shape of the shoulder 530 is suitable for machine working, and this reduces the process step count of machine working and reduces the weight of the shoulder 530 itself.

Embodiment 6

Next, by referring to FIG. 9, a friction stir welding tool according to embodiment 6 of the present invention will be outlined. The following description will focus on those respects in which the friction stir welding tool according to embodiment 6 is different in configuration from the friction stir welding tools according to embodiments 1 to 5; otherwise, identical reference numerals used in embodiments 2 and 6 indicate identical elements in embodiments 2 and 6.

Figure 9A:
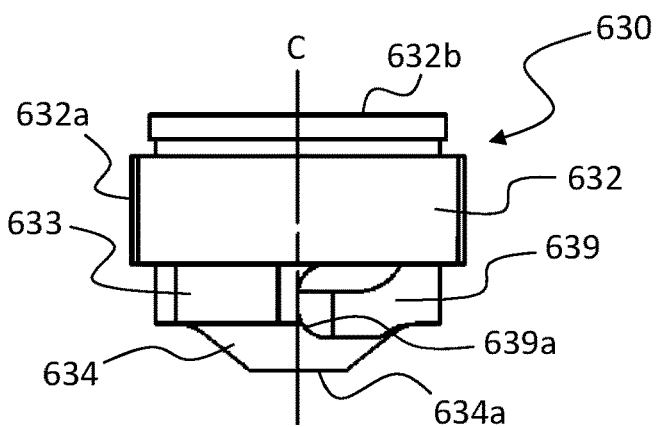
FIG. 9A is a side view of a specific configuration of a shoulder applied to a friction stir welding tool according to embodiment 6 of the present invention.
Figure 9B:
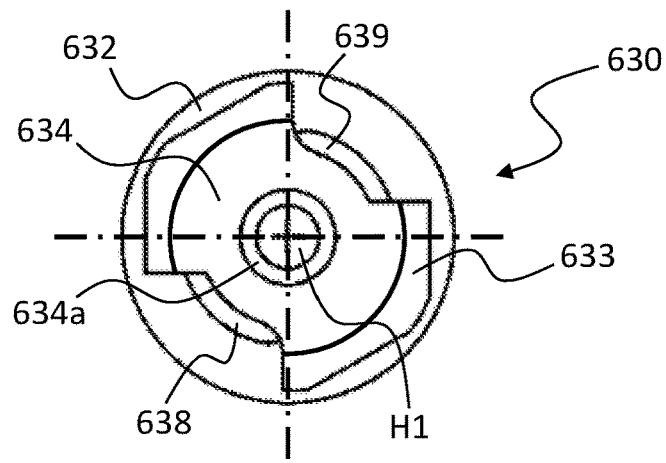
FIG. 9B is a bottom side view of a specific configuration of the shoulder applied to the friction stir welding tool according to embodiment 6 of the present invention.
Figure 9C:
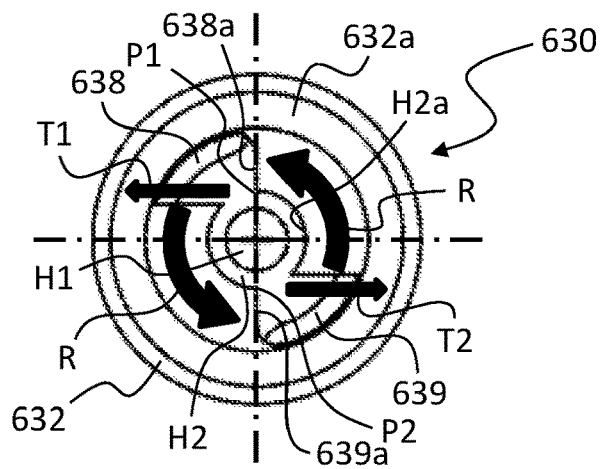
FIG. 9C is a top side view of a specific configuration of the shoulder applied to the friction stir welding tool according to embodiment 6 of the present invention.

FIGS. 9A to 9C illustrate a specific configuration of a shoulder applied to the friction stir welding tool according to embodiment 6 of the present invention. FIG. 9A is a side view of the shoulder, FIG. 9B is a bottom side view of the shoulder, and FIG. 9C is a top side view of the shoulder. As illustrated in FIG. 9A, a shoulder 630 according to embodiment 6 has a configuration similar to the shoulder according to embodiment 3; that is, an attached portion 632, a smaller diameter portion 633, and a protrusion 634 are integral to each other. A first surface 634a is located at one end of the protrusion 634 and serves as a shoulder surface that contacts the workpieces at the time of friction stir welding. The attached portion 632 has an external thread on a held surface 632a. The attached portion 632 also has a positioning surface 632b at the upper end of the attached portion 632. The positioning surface 632b contacts the contact surface 217b of the housing body 212.

As illustrated in FIGS. 9B and 9C, the shoulder 630 has two discharge holes 638 and 639. The discharge holes 638 and 639 are formed by cutting part of the shoulder 630 and connects the second housing hole H2 to the outside of the shoulder 630. It is possible to form the discharge holes 638 and 639 such that the plastically flowing excess metal (see reference numeral M in FIG. 3), which is a part of the workpieces W, is guided by a flow occurring by rotation of the stir pin 220 and is discharged from the housing hole SH to outside the shoulder 630.

As an example of such discharge hole, the shoulder 630 includes a connection position P1, similarly to embodiment 2. The connection position P1 is where the inner surface, 638a, of the discharge hole 638 and the inner surface H2a of the second housing hole H2 are connected to each other in the rotation direction R of the stir pin. In this respect, the discharge hole 638 includes the tangent direction T1 of the inner circumference of the second housing hole H2 at the connection position P1.

The shoulder 630 also includes a connection position P2. The connection position P2 is where the inner surface, 639a, of the discharge hole 639 and the inner surface H2a of the second housing hole H2 are connected to each other in the rotation direction R of the stir pin. In this respect, the discharge hole 639 includes the tangent direction T2 of the inner circumference of the second housing hole H2 at the connection position P2. This configuration ensures that the excess metal is discharged outside continuously and smoothly through the two discharge holes 638 and 639 by the rotation of the stir pin during welding.

The two discharge holes 638 and 639 are preferably arranged at positions opposed to each other in the circumferential direction of the second housing hole H2, that is, arranged at equal intervals. This configuration maintains a balance in the rigidity of the entire shoulder 630 after subjected to cutting, resulting in efficient discharge of excess metal.

With the above-described configuration, the friction stir welding tool according to embodiment 6 of the present invention provides the following advantageous effects, in addition to the advantageous effects of provided in embodiments 1 to 5. Since a plurality of discharge holes 638 and 639 are formed in the shoulder 630, the discharge efficiency of excess metal further increases. This configuration, as a result, further eliminates or minimizes excessive frictional heating between the stir pin and the excess metal, and eliminates or minimizes degradation of strength of the stir pin, damage to the stir pin, and/or other occurrences in the stir pin.

While a representative embodiment and modifications according to the present invention have been described hereinabove, the present invention will not be limited to the embodiment and modifications; it is to be appreciated that various changes may be made by one of ordinary skill in the art, That is, numerous modifications and variations of the present invention are possible without departing from the spirit and scope of the appended claims.

For example, while the friction stir welding tools and the friction stir welders according to embodiments 1 to 6 have been described as being used in continuous welding of materials, this is not intended as excluding the use of the tools and welders in point welding applications.

For example, while in embodiments 1 to 6 a discharge hole formed in the housing has been described, it is possible to provide the housing with an additional structure that receives excess metal discharged through the discharge hole so as to prevent the excess metal from dropping on the upper surfaces of the workpieces. Also, while in embodiments 1 to 6 the shoulder surface (first surface) has been described as a surface to contact the workpieces during friction stir welding, the shoulder surface may not necessarily be flat but may have a depression or protrusion. It is also possible to form a cross-shaped groove, a spiral groove, or another form of groove on the shoulder surface.

While in embodiments 2 to 5 the housing and the shoulder have been described as being connected to each other using screws, it is possible to use another form of attachment structure such as: an absorption structure using magnetic force or vacuum pressure; and a chucking structure using a gripper or another form of chucking means.

While in embodiment 6 two discharge holes have been described as an example of a plurality of discharge holes, it is possible to form three or more discharge holes in consideration of the rigidity of the shoulder as a whole and the discharge efficiency of excess metal. Further, while in embodiment 6 a plurality of discharge holes are formed in the detachable shoulder described in embodiments 2 to 5, it is also possible to form the plurality of discharge holes in the housing body described in embodiment 1.

Obviously, numerous modifications and variations of the present invention are possible in light of the above teachings. It is therefore to be understood that within the scope of the appended claims, the present invention may be practiced otherwise than as specifically described herein.

What is claimed is:

1. A friction stir welding tool comprising:
   a housing comprising:
     a first surface;
     a housing hole formed in the housing and having a housing hole opening on the first surface; and
     a discharge hole through which the housing hole is in communication with an outside of the housing; and
   a stir pin provided in the housing hole to be rotatable around a rotation axis which passes through the housing hole opening, the stir pin comprising:
     a pin holder having a first end portion and a second end portion opposite to the first end portion along the rotation axis, the first end portion being configured to be connected to a rotation spindle; and
     a pin body that is provided in the housing hole and that is detachably attached to the second end portion of the pin holder, the pin body being rotatable together with the pin holder around the rotation axis and including a stir portion that protrudes from the first surface via the housing hole opening and that is configured to be inserted into a workpiece,
   wherein the housing hole comprises a first housing hole and a second housing hole that are connected to each other in an axial direction along the rotation axis,
   wherein the first housing hole is open on the first surface,
   wherein the second housing hole has a hole diameter larger than a hole diameter of the first housing hole,
   wherein the discharge hole communicates with the second housing hole, and
   wherein the discharge hole is defined by:
     a bottom surface coplanar with a boundary between the first housing hole and the second housing hole in the axial direction;
     a top surface opposite to the bottom surface in the axial direction; and
     an inner surface connecting the bottom surface and the top surface and extending from the second housing hole in a radial direction with respect to the rotational axis; and
     an additional inner surface connecting the bottom surface and the top surface opposite to the inner surface such that a connection position connecting the inner surface and a circumference of the second housing hole is viewable from outside the housing in a tangent direction that is tangent to the circumference of the second housing hole at the connection position as viewed in the axial direction.

2. The friction stir welding tool according to claim 1, wherein the housing comprises a shoulder and a housing body that are separate from each other, the shoulder comprising the first surface and the discharge hole,
   wherein the shoulder comprises an attached portion that is attached to the housing body, and
   wherein the housing body comprises a holding portion that holds the attached portion.

3. The friction stir welding tool according to claim 2, wherein the attached portion comprises a positioning surface for identifying a position at which the shoulder is attached to the housing body, and
   wherein the holding portion comprises a contact surface that contacts the positioning surface.

4. The friction stir welding tool according to claim 1, wherein the workpiece entering the housing moves along a flow caused by rotation of the stir pin and discharged via the discharge hole to outside the housing through the housing hole.

5. The friction stir welding tool according to claim 1, wherein the discharge hole includes a plurality of holes that are connected to the housing hole at positions located at equal intervals.

6. The friction stir welding tool according to claim 1, wherein the first surface of the housing constitutes a shoulder surface that contacts the workpiece.

7. A friction stir welder comprising:
   a headstock comprising a rotation spindle;
   a machining table on which a workpiece is held;
   a numerical controller configured to control a relative movement of the headstock and the machining table relative to each other; and
   a friction stir welding tool mounted on the headstock, the friction stir welding tool comprising:
     a housing comprising:
       a first surface;
       a housing hole formed in the housing and having a housing hole opening on the first surface; and
       a discharge hole through which the housing hole is in communication with an outside of the housing; and
     a stir pin provided in the housing hole to be rotatable around a rotation axis which passes through the housing hole opening, the stir pin comprising:
       a pin holder having a first end portion and a second end portion opposite to the first end portion along the rotation axis, the first end portion being configured to be connected to the rotation spindle; and
       a pin body that is provided in the housing hole and that is detachably attached to the second end portion of the pin holder, the pin body being rotatable together with the pin holder around the rotation axis and including a stir portion that protrudes from the first surface via the housing hole opening and that is configured to be inserted into a workpiece,
wherein the housing hole of the friction stir welding tool comprises a first housing hole and a second housing hole that are connected to each other in an axial direction along the rotation axis,
wherein the first housing hole is open on the first surface and has a hole diameter smaller than a hole diameter of the second housing hole,
wherein the discharge hole communicates with the second housing hole, and
wherein the discharge hole is defined by:
- a bottom surface coplanar with a boundary between the first housing hole and the second housing hole in the axial direction;
- a top surface opposite to the bottom surface in the axial direction; and
- an inner surface connecting the bottom surface and the top surface and extending from the second housing hole in a radial direction with respect to the rotational axis; and
- an additional inner surface connecting the bottom surface and the top surface opposite to the inner surface such that a connection position connecting the inner surface and a circumference of the second housing hole is viewable from outside the housing in a tangent direction that is tangent to the circumference of the second housing hole at the connection position as viewed in the axial direction.

8. The friction stir welder according to claim 7,
wherein the housing of the friction stir welding tool comprises a shoulder and a housing body that are separate from each other, the shoulder comprising the first surface and the discharge hole,
wherein the shoulder comprises an attached portion that is attached to the housing body, and
wherein the housing body comprises a holding portion that holds the attached portion.

9. The friction stir welder according to claim 7, wherein the first surface of the housing of the friction stir welding tool constitutes a shoulder surface that contacts the workpiece.

10. The friction stir welding tool according to claim 2, wherein the workpiece entering the housing moves along a flow caused by rotation of the stir pin and discharged via the discharge hole to outside the housing through the housing hole.

11. The friction stir welding tool according to claim 3, wherein the workpiece entering the housing moves along a flow caused by rotation of the stir pin and discharged via the discharge hole to outside the housing through the housing hole.

12. The friction stir welding tool according to claim 1, wherein the discharge hole is located between the housing hole opening and the second end portion of the pin holder.

13. The friction stir welding tool according to claim 1, wherein the tangent direction is substantially perpendicular to the radial direction and the axial direction.

14. The friction stir welder according to claim 7, wherein the tangent direction is substantially perpendicular to the radial direction and the axial direction.

15. The friction stir welding tool according to claim 2, wherein the discharge hole includes a plurality of holes that are connected to the housing hole at positions located at equal intervals.

16. The friction stir welding tool according to claim 3, wherein the discharge hole includes a plurality of holes that are connected to the housing hole at positions located at equal intervals.

17. The friction stir welding tool according to claim 4, wherein the discharge hole includes a plurality of holes that are connected to the housing hole at positions located at equal intervals.

18. The friction stir welding tool according to claim 2, wherein the first surface of the housing constitutes a shoulder surface that contacts the workpiece.

19. The friction stir welding tool according to claim 3, wherein the first surface of the housing constitutes a shoulder surface that contacts the workpiece.

20. The friction stir welding tool according to claim 4, wherein the first surface of the housing constitutes a shoulder surface that contacts the workpiece.

* * * * *